US008779371B2

(12) United States Patent  
Moriya et al.

(10) Patent No.: US 8,779,371 B2
(45) Date of Patent: Jul. 15, 2014

(54) SCINTILLATOR, METHOD FOR MANUFACTURING SCINTILLATOR, AND RADIATION DETECTOR (75) Inventors: Takahiro Moriya, Hamamatsu (JP); Takaji Yamashita, Hamamatsu (JP); Makoto Kakegawa, Hamamatsu (JP)

(73) Assignee: Hamamatsu Photonics K.K., Hamamatsu-shi, Shizuoka (JP)

( * ) Notice: Subject to any disclaimer, the term of this patent is extended or adjusted under 35 U.S.C. 154(b) by 459 days.

(21) Appl. No.: 12/991,013

(22) PCT Filed: Mar. 13, 2009

(86) PCT No.: PCT/JP2009/054925
§ 371 (c)(1),
(2), (4) Date: Feb. 1, 2011

(87) PCT Pub. No.: WO2009/136519
PCT Pub. Date: Nov. 12, 2009

(65) Prior Publication Data
US 2011/0121192 A1 May 26, 2011

(30) Foreign Application Priority Data

May 8, 2008 (JP) ............................... P2008-122432

(51) Int. Cl.
*G01T 1/202* (2006.01)
*H01L 21/00* (2006.01)

(52) U.S. Cl.
CPC ..................................... *G01T 1/202* (2013.01)
USPC ................. 250/370.11; 257/E31.086; 438/56

(58) Field of Classification Search
CPC ....................................................... G01T 1/202

USPC ........ 250/370.11, 368, 363.03; 257/E31.086; 438/56; 264/21, 400
See application file for complete search history.

(56) References Cited

U.S. PATENT DOCUMENTS

| | | | | |
|---|---|---|---|---|
| 5,229,613 A | * | 7/1993 | Pandelisev et al. | 250/368 |
| 6,369,391 B1 | * | 4/2002 | Hefetz et al. | 250/368 |
| 6,563,121 B1 | * | 5/2003 | Schreiner et al. | 250/368 |
| 7,138,638 B2 | * | 11/2006 | Juni | 250/370.11 |
| 8,470,214 B2 | * | 6/2013 | Corbeil et al. | 264/1.37 |
| 2004/0262526 A1 | | 12/2004 | Corbeil et al. | |
| 2005/0023733 A1 | * | 2/2005 | Burr | 264/400 |

FOREIGN PATENT DOCUMENTS

| | | |
|---|---|---|
| CN | 1779867 | 5/2006 |
| JP | 2002-513469 | 5/2002 |
| JP | 2005-293735 | 10/2005 |
| JP | 2007-217202 | 8/2007 |
| JP | 2007-532864 | 11/2007 |
| JP | 2008-51701 | 3/2008 |
| WO | 2008/023451 | 2/2008 |
| WO | WO 2008/120441 | 10/2008 |

* cited by examiner

*Primary Examiner* — David Porta
*Assistant Examiner* — Faye Boosalis
(74) *Attorney, Agent, or Firm* — Drinker Biddle & Reath LLP

(57) ABSTRACT

A radiation detector is provided with a scintillator 2A containing a plurality of modified regions 21 and a plurality of photodetectors or a position-sensitive photodetector optically coupled to a surface of the scintillator 2A. The plurality of modified regions 21 are formed by irradiating an inside of a crystalline lump which will act as the scintillator 2A with a laser beam and three-dimensionally dotted and have a refractive index different from a refractive index of a surrounding region within the inside of the scintillator 2A.

5 Claims, 9 Drawing Sheets

SCINTILLATOR, METHOD FOR MANUFACTURING SCINTILLATOR, AND RADIATION DETECTOR

TECHNICAL FIELD

The present invention relates to a scintillator, a method for manufacturing a scintillator, and a radiation detector.

BACKGROUND ART

A radiation detector is used, for example, in a PET (Positron Emission Tomography) scanner. The radiation detector used in the PET scanner detects a pair of gamma rays generated in association with electron/positron pair annihilation within a specimen into which a positron emission isotope (RI radiation source) is injected to make a flight in the reverse direction of each other. The PET scanner detects a pair of gamma rays by a coincidence method which utilizes a plurality of radiation detectors, thereby accumulating the coincidence counting information thereof to prepare a histogram. Then, on the basis of the histogram, the PET scanner reconstructs an image indicating a spatial distribution of generation frequencies of a pair of gamma rays at a space to be measured. The PET scanner has played an important role in nuclear medicine, etc., and can be used for conducting research on functions of the body and high-level functions of the brain.

As a radiation detector favorably used in the above-described PET scanner and others, there is available that which has a scintillator and a photodetector. The scintillator absorbs incident gamma rays and generates scintillation light. The photodetector is attached to a surface of the scintillator to detect scintillation light. The above constitution is able to identify a gamma-ray incident position in the scintillator and the amount of gamma rays.

Patent Document 1 has disclosed a radiation detector having a scintillator and a photodetector. The scintillator described in the literature has internally a light guide region which restricts a scintillation-light advancing direction. Examples of the above-described light guide region include a boundary face between media substantially different in refractive index, reflection films, bubbles, defects, and crystal defects such as crystal grain boundary.

Further, Patent Document 2 has disclosed a technology in which multi-photon absorption by femtosecond pulse laser light is used to form an amorphous-structured modified region different in refractive index from the surrounding region thereof inside an object to be processed such as a silicon base plate, silica glass or sapphire.

Patent Document 1: Japanese Unexamined Patent Application Publication (Translation of PCT Application) No. 2007-532864

Patent Document 2: Japanese Unexamined Patent Application Publication No. 2005-293735

DISCLOSURE OF THE INVENTION

Problems to be Solved by the Invention

A scintillator of a radiation detector which has been conventionally used in a PET, etc., is achieved by a scintillator array in which a plurality of scintillator cells are arranged two-dimensionally or three-dimensionally. Enhanced position resolution in the above-described scintillator array requires downsizing of individual scintillator cells. In recent years, a scintillator cell which has a few-millimeter or sub-millimeter pitch has been demanded. However, as scintillator cells are made smaller, it is more difficult to assemble the scintillator array, resulting in a longer manufacturing period and an increase in manufacturing cost. Further, individual scintillator cells are required to be mechanically processed, thereby limiting the downsizing of the scintillator cells. Therefore, a radiation detector has been suppressed for enhanced position resolution and consequently a PET scanner has also been suppressed for enhanced resolution.

It is noted that in the technology described in Patent Document 1, a light guide region is rendered non-sensitive with respect to radiation, thereby a scintillator is decreased in radiation detecting sensitivity. Further, the technology described in Patent Document 2 covers a method for manufacturing an optical memory element, which is different from a radiation detector.

The present invention has been made in view of the above problems, an object of which is to provide a scintillator to be easily manufactured and also attain a high position resolution, a method for manufacturing the scintillator, and a radiation detector.

Means for Solving the Problems

In order to solve the above problems, the method for manufacturing the scintillator of the present invention is a method for manufacturing a scintillator used in a radiation detector provided with a scintillator, a plurality of photodetectors or a position-sensitive photodetector optically coupled to a surface of the scintillator. The method includes a step of forming a plurality of modified regions by irradiating an inside of a crystalline lump which will act as the scintillator with a laser beam, wherein the plurality of modified regions are three-dimensionally dotted and have a refractive index different from a refractive index of a surrounding region within the inside of the crystalline lump. Further, the scintillator of the present invention includes a plurality of modified regions formed by irradiating an inside of a crystalline lump which will act as the scintillator with a laser beam, wherein the plurality of modified regions are three-dimensionally dotted and have a refractive index different from a refractive index of a surrounding region within the inside of the crystalline lump.

Further, the radiation detector of the present invention is provided with a scintillator containing a plurality of modified regions and a plurality of photodetectors or a position-sensitive photodetector optically coupled to a surface of the scintillator. The plurality of modified regions are formed by irradiating an inside of a crystalline lump which will act as the scintillator with a laser beam. The modified regions are three-dimensionally dotted and have a refractive index different from a refractive index of a surrounding region within the inside of the crystalline lump.

In the scintillator manufactured by the above-described method and the radiation detector, a plurality of modified regions which are three-dimensionally dotted and have a refractive index different from a refractive index of the surrounding region are used to control a direction in which scintillator light advances inside the scintillator, thus making it possible to favorably allocate scintillation light to each of the plurality of photodetectors or to the position-sensitive photodetector. Then, the plurality of modified regions are formed by the irradiation of the laser beam, by which, for example, extremely fine modified regions with a diameter of several micrometers can be formed at any given position inside the scintillator at a high density. Therefore, according to the above-described method for manufacturing the scintillator and the radiation detector, it is possible to provide a higher position resolution than a conventional method in which a plurality of scintillator cells are arrayed two-dimensionally or three-dimensionally. Further, according to the above-described method for manufacturing the scintillator and the radiation detector, a crystalline lump which will act as the scintillator is irradiated with a laser beam, thereby forming a plurality of modified regions. Therefore, no mechanical processing is needed when a plurality of modified regions are formed, thereby manufacturing the scintillator quite easily as compared with a conventional method in which a plurality of scintillator cells are arrayed.

Further, in the method for manufacturing the scintillator, each of the modified regions may be arranged in such a manner that scintillation light of the scintillator is allocated at an allocation ratio according to the generation position thereof to each of the plurality of photodetectors or the position-sensitive photodetector. Similarly, in the radiation detector, each of the plurality of modified regions may be arranged in such a manner that scintillation light of the scintillator is allocated at an allocation ratio according to the generation position thereof to each of the plurality of photodetectors or the position-sensitive photodetector. Thereby, it is possible to calculate easily an incident position of radiation into the scintillator.

Still further, in the method for manufacturing the scintillator and the radiation detector, each of the plurality of modified regions may be at least one of a region scattering light and a region constituting a diffraction lens. Thereby, it is possible to favorably provide a plurality of modified regions which are formed by the irradiation of the laser beam and different in refractive index from the surrounding region.

Effect of the Invention

According to the scintillator, the scintillator manufacturing method and the radiation detector of the present invention, it is possible to easily manufacture a scintillator with a high position resolution.

DESCRIPTION OF SYMBOLS 1A to 1F: Radiation detector, 2A to 2F: Scintillator, 3: Photodetector, 3A: Position-sensitive photodetector, 21: Modified region, 22: Crystalline lump, 100: Light source portion, 102: Light focusing optical system, Lf: Femtosecond pulse laser light, SC: Scintillation light

BEST MODES FOR CARRYING OUT THE INVENTION

Hereinafter, an explanation will be made in detail for embodiments of the scintillator manufacturing method and the radiation detector of the present invention with reference to the attached drawings. It is noted that in explaining the drawings, the same symbols are given to the same elements to omit overlapping explanation.

Figure 1:
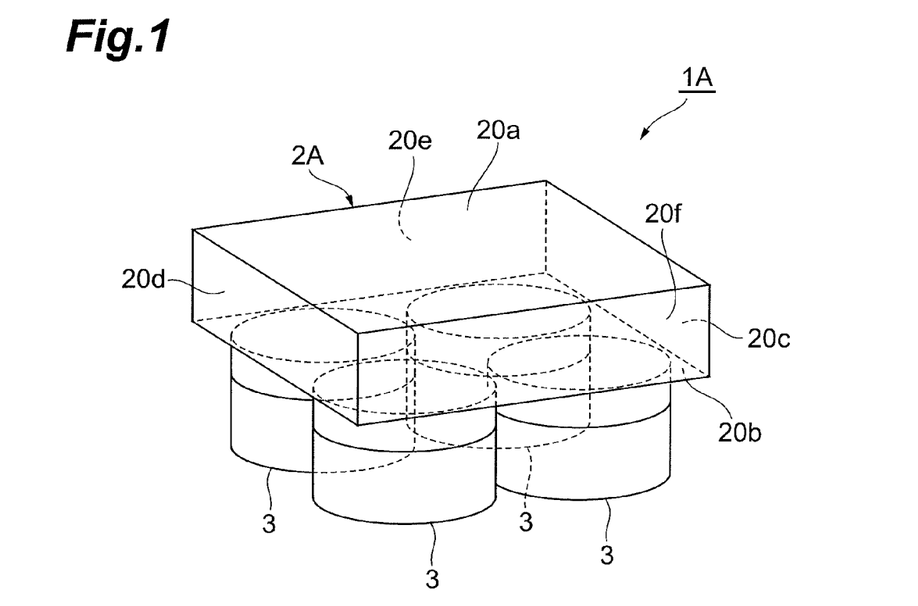
FIG. 1 is a perspective view showing an appearance of a radiation detector related to one embodiment of the present invention.

First, an explanation will be made for one embodiment of a radiation detector having the scintillator manufactured by the scintillator manufacturing method of the present invention. FIG. 1 is a perspective view showing an appearance of a radiation detector 1A of the present embodiment. The radiation detector 1A of the present embodiment is provided with a scintillator 2A and a plurality of photodetectors 3.

The scintillator 2A is able to assume various appearances, for example, a polyhedron and a sphere. The scintillator 2A of the present embodiment assumes approximately a rectangular solid appearance, having a pair of square plate faces 20a, 20b and four rectangular side faces 20c, 20d, 20e, 20f orthogonal to the plate faces 20a, 20b. The scintillator 2A absorbs radiation such as gamma rays and generates scintillation light according to the intensity of the radiation dosage. This scintillator 2A is favorably constituted with crystals of $Gd_2SiO_5$ (GSO), $Lu_2SiO_5$ (LSO) and $Bi_4Ge_3O_{12}$ (BGO) which are doped with Ce, for example.

The plurality of photodetectors 3 are constituted with light sensors such as a photomultiplier tube, an avalanche photodiode and an MPPC (Multi-Pixel Photon Counter). It is noted that the MPPC is a photon counting device composed of a plurality of Geiger mode APD (avalanche photodiode) pixels. Each of the photodetectors 3 is attached to the scintillator 2A in such a manner that the light detecting face thereof opposes the surface of the scintillator 2A and thereby optically coupled to the scintillator 2A. In the present embodiment, the radiation detector 1A is provided with four photodetectors 3, and these four photodetectors 3 are all arranged on the plate face 20b, one of the plate faces of the scintillator 2A. More specifically, each of the four photodetectors 3 is arranged on each of the regions obtained by dividing the plate face 20b into four square regions. Scintillation light generated in the scintillator 2A is allocated to each of the photodetectors 3 according to the generation position thereof, and on the basis of a ratio output from each of the photodetectors 3, scintillation light SC is identified for the generation position. It is noted that in place of the four photodetectors 3, a single position-sensitive photodetector 3A may be attached and used (refer to FIG. 9). The position-sensitive photodetector is a device which outputs an electric signal according to a light incident position on a photodetector surface.

Figure 2:
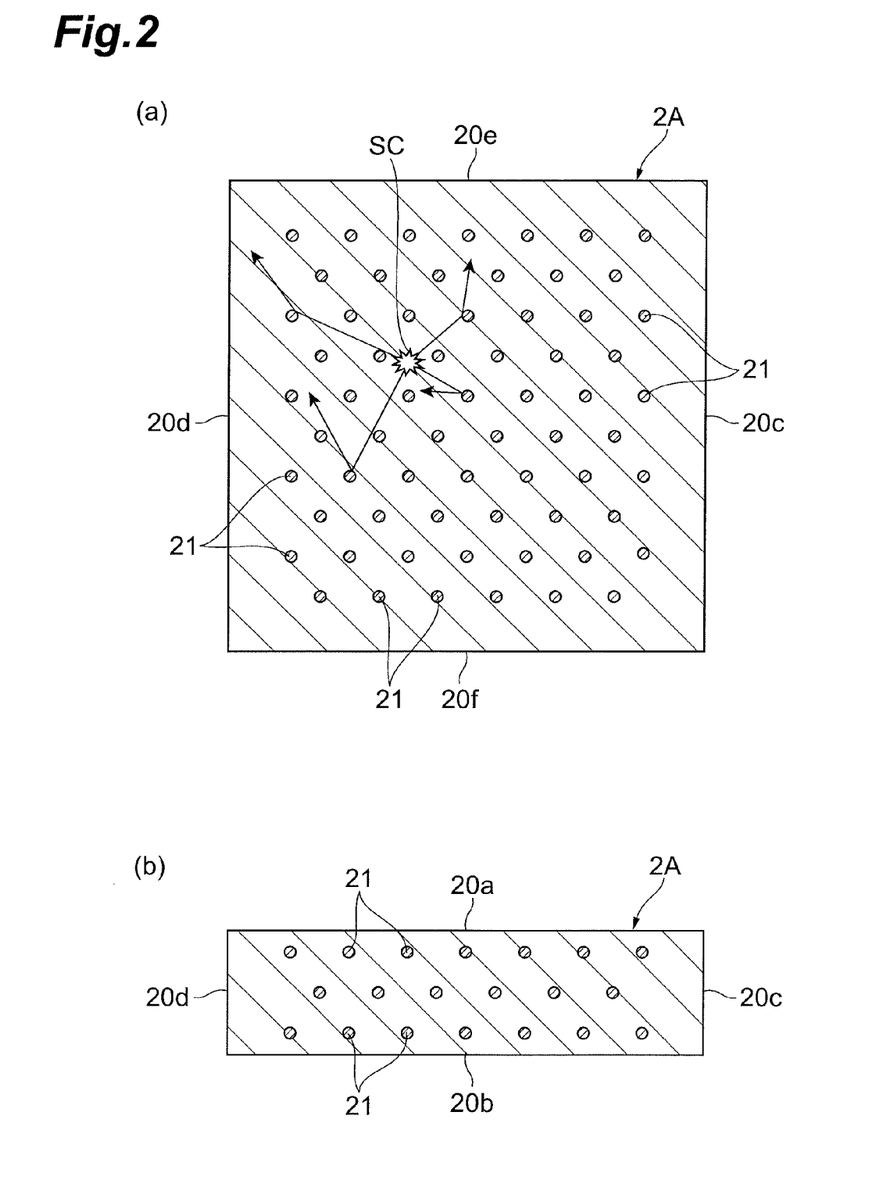
FIG. 2 shows cross sectional views showing an inner structure of a scintillator.

FIG. 2 shows cross sectional views showing an internal constitution of the scintillator 2A of the present embodiment. FIG. 2(a) shows a planar cross section of the scintillator 2A. FIG. 2(b) shows a side cross section of the scintillator 2A. As shown in FIGS. 2(a) and (b), a plurality of modified regions 21 are formed inside the scintillator 2A. The plurality of modified regions 21 have a refractive index different from a refractive index of a surrounding region in the scintillator 2A. Each of the plurality of modified regions 21 can be constituted with at least one of a region scattering light and a region constituting a diffraction lens, for example.

Each of the modified regions 21 is an extremely small dot-like region, for example, several micrometers in diameter.

Each of the modified regions 21 is three-dimensionally dotted inside the scintillator 2A and distributed at random or in a regular manner. A favorable arrangement of these modified regions 21 includes that in which, for example, each of the modified regions 21 is arranged in such a manner that scintillation light SC generated in the scintillator 2A is allocated at an allocation ratio according to the generation position thereof to each of the photodetectors 3 (or a photodetector surface of the position-sensitive photodetector 3A). It is noted that being allocated at an allocation ratio according to the generation position means that, for example, the intensity of light which is made incident into each of the photodetectors 3 by generation of scintillation light SC is stronger as the generation position thereof is closer from the photodetector 3 concerned and the intensity of light is given as a function of a distance between the generation position of the scintillation light SC viewed from the plate face 20a and each of the photodetectors 3.

Here, an explanation will be made for a method for determining an arrangement pattern (density distribution) of the modified regions 21 in the scintillator 2A. In determining an arrangement pattern of the modified regions 21, it is desirable that where scintillation light SC is generated at any position inside the scintillator 2A, the scintillation light SC is allocated to each of the photodetectors 3 at such an allocation ratio that resolving power in identifying the generation position of the scintillation light SC is maximized (that is, resolution is minimized).

For example, where two photodetectors a, b are connected to both ends of a face in parallel with an X axis in a rod-like scintillator having an X-direction length of L, the respective optimum response functions Fa and Fb of the photodetectors a, b in one-dimensional position calculation (X direction) are given by the following formulas.

$$Fa(x) = K \sin^2(\alpha x)$$

$$Fb(x) = K \cos^2(\alpha x)$$

It is noted that in the above formulas, K is a constant, $\alpha$ is $\pi/(2L)$ and L is a width of the scintillator.

Further, where the above formulas are extended to two-dimensional formulas to connect four photodetectors (that is, as with the present embodiment where the photodetectors 3 are arranged), the respective optimum response functions, Fa, Fb, Fc, Fd of the photodetectors a, b, c, d are given by the following formulas.

$$Fa(x,y) = K \sin^2(\alpha x)\sin^2(\beta y)$$

$$Fb(x,y) = K \sin^2(\alpha x)\cos^2(\beta y)$$

$$Fc(x,y) = K \cos^2(\alpha x)\sin^2(\beta y)$$

$$Fd(x,y) = K \cos^2(\alpha x)\cos^2(\beta y)$$

In order to obtain a high resolving power (resolution) in the scintillator 2A in its entirety, it is desirable that a density distribution pattern of the modified regions 21 is formed inside the scintillator 2A so as to provide the responses (light allocation) of the photodetectors as described in the above formulas. It is noted that in order to form the above density distribution pattern, a method is applicable for solving a light diffusion equation used, for example, in light diffusion imaging by a successive approximation.

Figure 3:
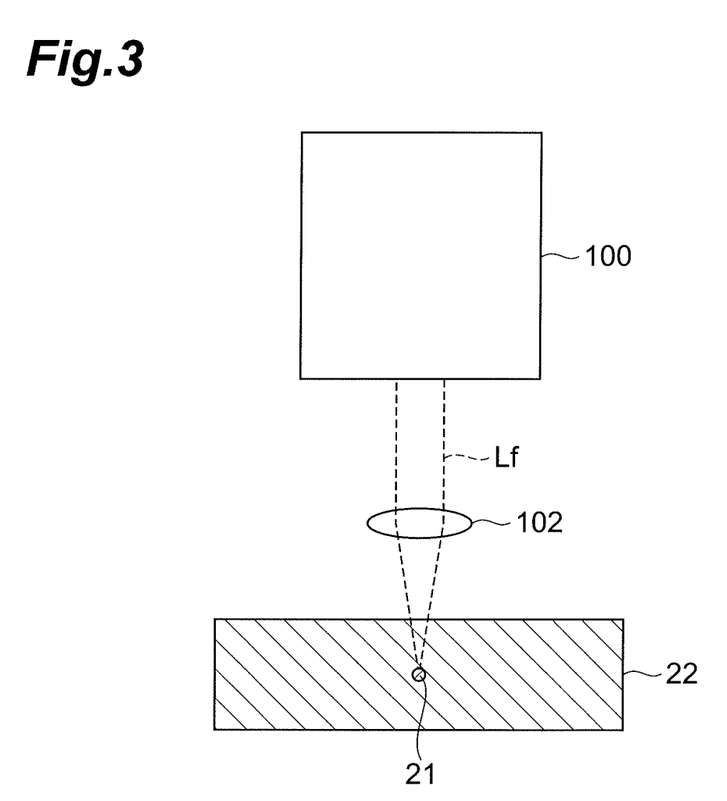
FIG. 3 is a view for explaining a step of manufacturing the scintillator containing a plurality of modified regions.

FIG. 3 is a view for explaining a step of manufacturing the scintillator 2A containing a plurality of modified regions 21. As shown in FIG. 3, each of the modified regions 21 is formed by irradiating an inside of a crystalline lump 22 which will act as the scintillator 2A with femtosecond pulse laser light Lf.

More specifically, a light source portion 100 which outputs a pulse laser beam and a light focusing optical system 102 arranged between the light source portion 100 and the crystalline lump 22 are used to make the time duration of the pulse laser beam on the order of femtoseconds, thereby irradiating the crystalline lump 22 with the pulse laser beam Lf. Then, the light focusing optical system 102 is used to focus the femtosecond pulse laser light Lf on the surface of the scintillator 2A or the inside thereof. Then, a scintillator material at the light focused part is modified (made amorphous), by which at least one of a region different in refractive index in the scintillator 2A from the surrounding region such as a region whose refractive index is smaller than the surrounding region, a region scattering light, and a region constituting a diffraction lens, is produced inside the scintillator 2A, thereby forming each of the modified regions 21.

It is more desirable that a beam diameter adjusting portion for adjusting the beam diameter of the femtosecond pulse laser light Lf output from the light source portion 100 is disposed between the light source portion 100 and the light focusing optical system 102. Further, for example, the crystalline lump 22 before being processed is placed on a movement stage and the crystalline lump 22 is allowed to move by the movement stage in parallel along any given direction perpendicular to the optical axis of the femtosecond pulse laser light Lf or along an optical axis direction, thus making it possible to more easily form each of the modified regions 21 at a predetermined position.

In the scintillator 2A of the present embodiment and the radiation detector 1A having the scintillator 2A, scintillation light SC generated inside the scintillator 2A will be emitted in all directions from the generation position thereof. However, the scintillation light SC is scattered by the modified regions 21 which are three-dimensionally dotted and have a refractive index different from a refractive index of a surrounding region, thereby suppressing the straight advancing components. As a result, the scintillation light SC is restricted for its diffusion range. Therefore, an advancing direction (propagation path) at which the scintillation light SC generated inside the scintillator 2A arrives at each of the photodetectors 3 is controlled, by which the scintillation light SC can be allocated favorably at any given allocation ratio to each of the plurality of photodetectors 3. Further, the plurality of modified regions 21 are formed by the irradiation of femtosecond pulse laser light Lf, thereby, for example, extremely small modified regions 21 with a diameter of several micrometers can be formed at any given position inside the scintillator 2A at a high density. It is also possible to induce only change in refractive index without the occurrence of cracks inside the scintillator 2A.

Therefore, according to the scintillator 2A of the present embodiment, the manufacturing method thereof and the radiation detector 1A having the scintillator 2A, it is possible to increase a resolving power (position resolution) of detecting a light emitting position of the scintillation light SC, that is, a radiation incident position, as compared with a conventional method in which a plurality of scintillator cells are two-dimensionally or three-dimensionally arrayed.

Further, according to the method for manufacturing the scintillator 2A of the present embodiment, the crystalline lump 22 which will act as the scintillator 2A is irradiated with femtosecond pulse laser light Lf, thereby forming a plurality of modified regions 21. Thus, no mechanical processing is needed in forming the plurality of modified regions 21, and the scintillator 2A can be manufactured much more easily than a conventional method for arraying a plurality of scintillator cells. It is, therefore, possible to reduce the manufacturing cost and shorten the manufacturing period. It is noted that the regions which have been modified by the femtosecond pulse laser light Lf (made amorphous) can be returned to a state before being processed by anneal processing.

Further, for example, the light guide described in the previous Patent Document 1 becomes a non-sensitive region with respect to radiation. Since the modified regions 21 of the present embodiment are formed by the femtosecond pulse laser light Lf, they are quite small (about several micrometers in diameter) and also not deprived of scintillation light generating functions. Thus, according to the method for manufacturing the scintillator 2A of the present embodiment, it is possible to provide a scintillator completely free of any non-sensitive region.

Figure 9:
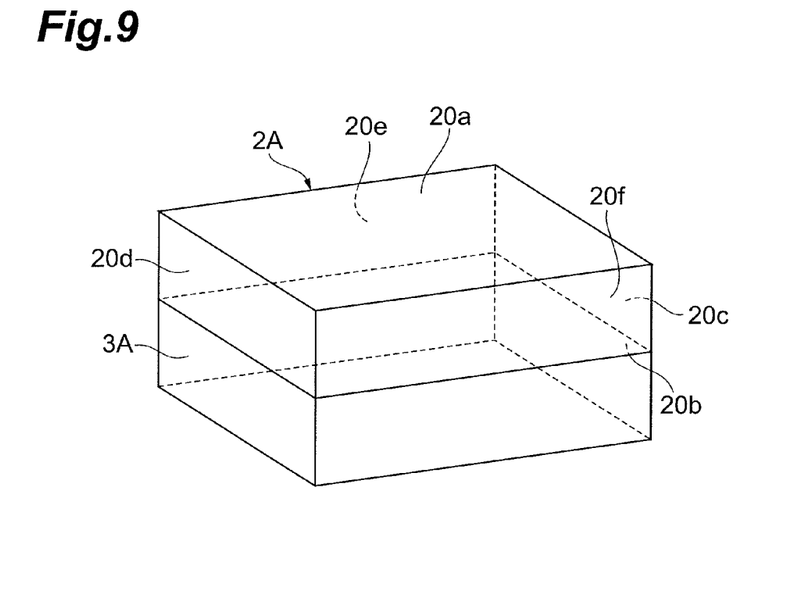
FIG. 9 is a perspective view showing an appearance of a radiation detector related to another embodiment.

Still further, as described in the present embodiment, it is preferable that each of the modified regions 21 is arranged in such a manner that the scintillation light SC of the scintillator 2A is allocated at an allocation ratio according to the generation position thereof to each of the plurality of photodetectors 3 (or to the position-sensitive photodetector 3A). Thereby, for example, as with the previously described optimum response functions Fa, Fb, Fc, Fd, an optimal light response function can be prepared with respect to any given geometric arrangement of the photodetectors 3. Therefore, it is possible to easily calculate an incident position of radiation into the scintillator 2A. Further, it is, thereby, possible to arrange the photodetectors 3 at a greater degree of freedom and reduce the number of the photodetectors 3.

In addition, as described in the present embodiment, it is preferable that each of the plurality of modified regions 21 is at least one of a region scattering light and a region constituting a diffraction lens. Thereby, it is possible to favorably provide the plurality of modified regions 21 which are formed by the irradiation of femtosecond pulse laser light Lf and have a refractive index different from a refractive index of the surrounding region.

In the present embodiment, it is more preferable that distortion of a light emitting position to be detected is corrected by optimizing a density distribution of the modified regions 21, thereby enhancing the linearity. It is also more preferable that the modified regions 21 are optimized for the density distribution to adjust light allocation to each of the photodetectors 3, thereby minimizing a position resolution.

MODIFIED EXAMPLE 1

Figure 4:
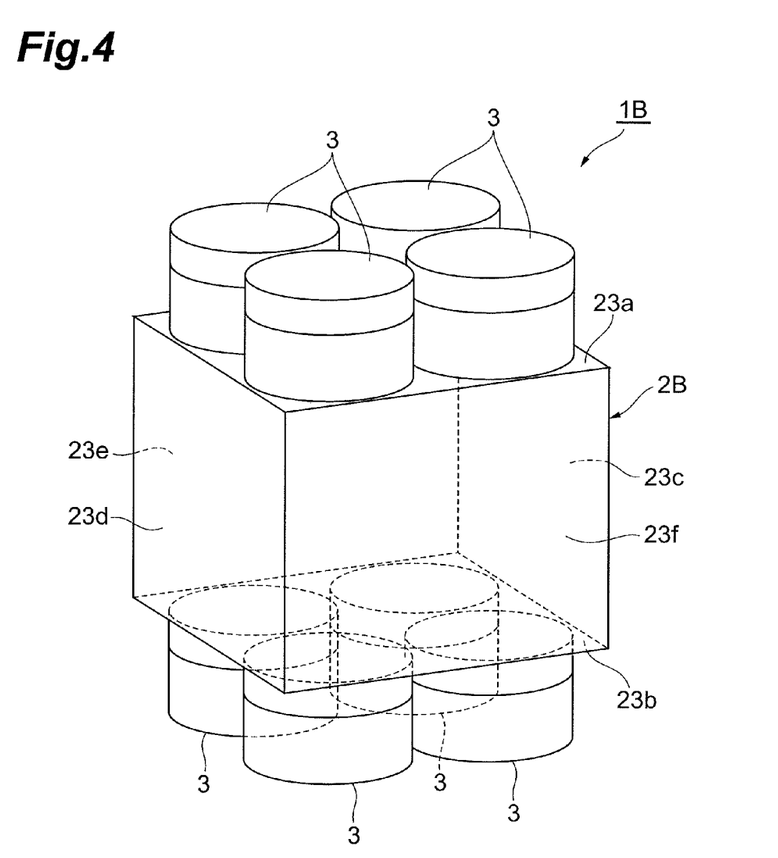
FIG. 4 is a perspective view showing an appearance of a radiation detector related to a modified example.

FIG. 4 is a perspective view showing an appearance of a radiation detector 1B as a modified example of the radiation detector related to the above-described embodiment. The radiation detector 1B of the present modified example is provided with a scintillator 2B and a plurality of photodetectors 3.

The scintillator 2B assumes an approximately cubic appearance and is provided with a pair of opposing faces 23a, 23b, and four side faces 23c, 23d, 23e, 23f orthogonal to these faces 23a, 23b. A constitution material of the scintillator 2B is similar to that of the scintillator 2A of the above-described embodiment. The scintillator 2B absorbs radiation such as gamma rays and generates scintillation light according to the intensity of the radiation dosage. Inside the scintillator 2B, there are formed a plurality of modified regions 21 (refer to FIG. 2).

A plurality of photodetectors 3 are, as with the above-described embodiment, constituted with light sensors such as photomultiplier tubes, avalanche photodiodes or MPPCs. Then, each of the photodetectors 3 is attached to the scintillator 2B in such a manner that the light detecting face thereof is opposed to a surface of the scintillator 2B, thereby optically coupled to the scintillator 2B. In the present modified example, the radiation detector 1B is provided with eight photodetectors 3, and four photodetectors 3 of these are arranged on the face 23a of the scintillator 2B, while the remaining four photodetectors 3 are arranged on the face 23b of the scintillator 2B. That is, these four photodetectors 3 are individually arranged on regions obtained by dividing the face 23a into four square regions, while the other four photodetectors 3 are arranged individually on regions obtained by dividing the face 23b into four square regions. Scintillation light generated in the scintillator 2B is allocated to each of the photodetectors 3 according to the generation position thereof. And on the basis of a ratio output from each of the photodetectors 3, the scintillation light SC is identified for its generation position.

The photodetectors are not limited to an embodiment where they are arranged only on one face of the scintillator as described in the previous embodiment but may be arranged on a plurality of faces (all the faces) of the scintillator as with the present modified example. In this case as well, an optimum response function of each of the photodetectors 3 can be obtained in a similar manner as the above-described embodiment. It is, thereby, possible to further enhance the resolution at a radiation incident position.

MODIFIED EXAMPLE 2

Figure 5:
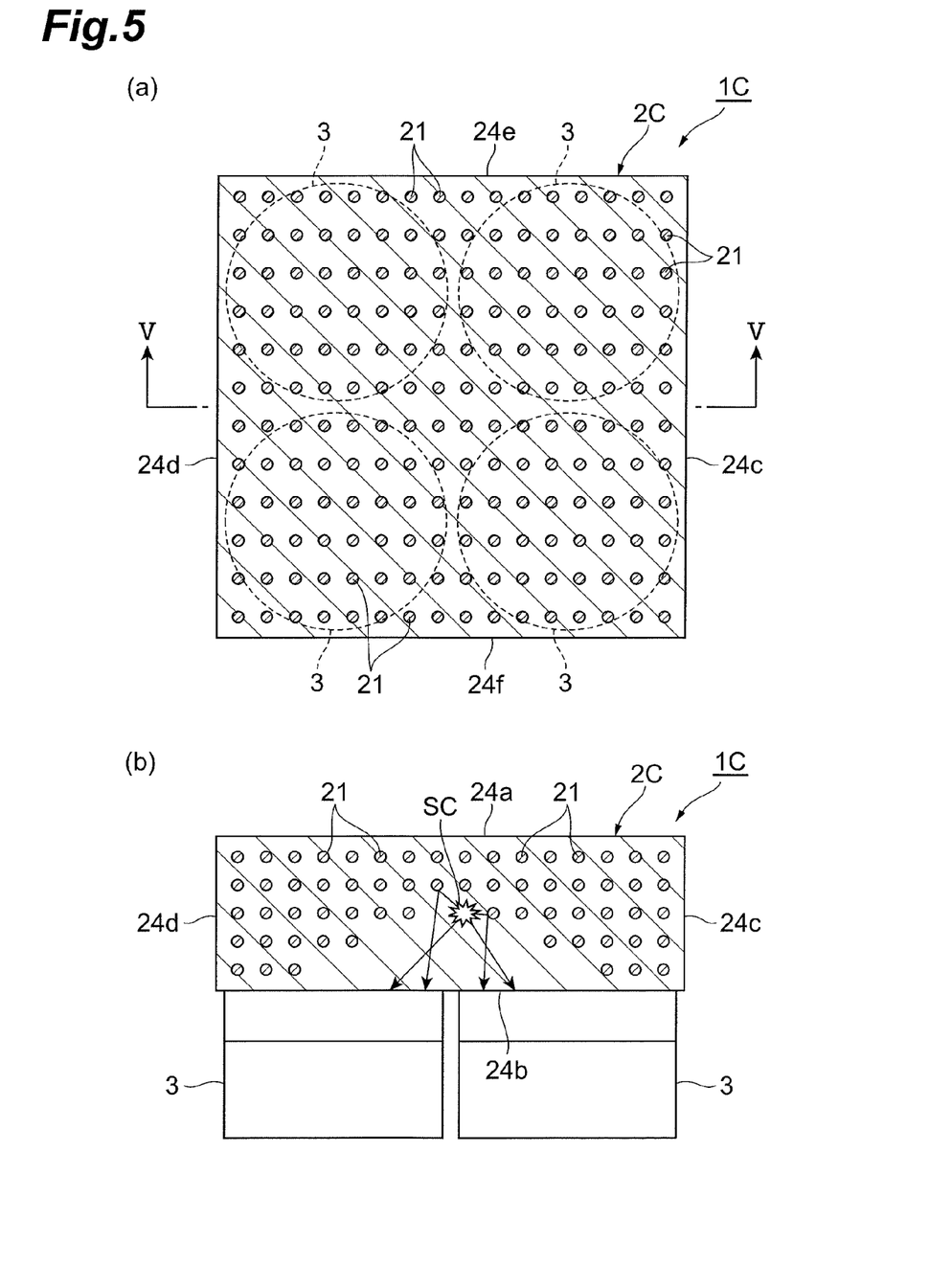
FIG. 5 shows views showing a constitution of the radiation detector related to the modified example.

FIG. 5 shows views showing a constitution of a radiation detector 1C as a modified example of the radiation detector related to the above embodiment. FIG. 5(a) is a planar cross sectional view of a scintillator 2C installed on the radiation detector 1C. FIG. 5(b) shows a cross section taken along line V to V in FIG. 5(a), that is, a side cross section of the radiation detector 1C. The radiation detector 1C of the present modified example is provided with the scintillator 2C and a plurality of photodetectors 3. It is noted that the plurality of photodetectors 3 are similar in constitution and arrangement to the previously described embodiment (FIG. 1), a detailed explanation of which will be omitted.

The scintillator 2C is similar in shape (appearance) to the previously described scintillator 2A and provided with a pair of plate faces 24a, 24b and four side faces 24c, 24d, 24e, 24f orthogonal to these faces 24a, 24b. Further, a constitution material of the scintillator 2C is the same as that of the scintillator 2A.

The scintillator 2C of the present modified example is different from the scintillator 2A of the above-described embodiment in arrangement of a plurality of modified regions 21. That is, in the scintillator 2C of the present modified example, the modified regions 21 are distributed at an equal density except at a certain region. Then, at a region close to the center of the scintillator 2C when viewed from the face 24b where the photodetectors 3 are arranged (in particular, a region close to the center of the plate face 24b), the modified regions 21 are reduced in density. As described above, the modified regions 21 close to the center of the scintillator 2C are reduced in density, by which scintillation light SC generated near the center of the scintillator 2C can be favorably made incident into each of the photodetectors 3.

Figure 6:
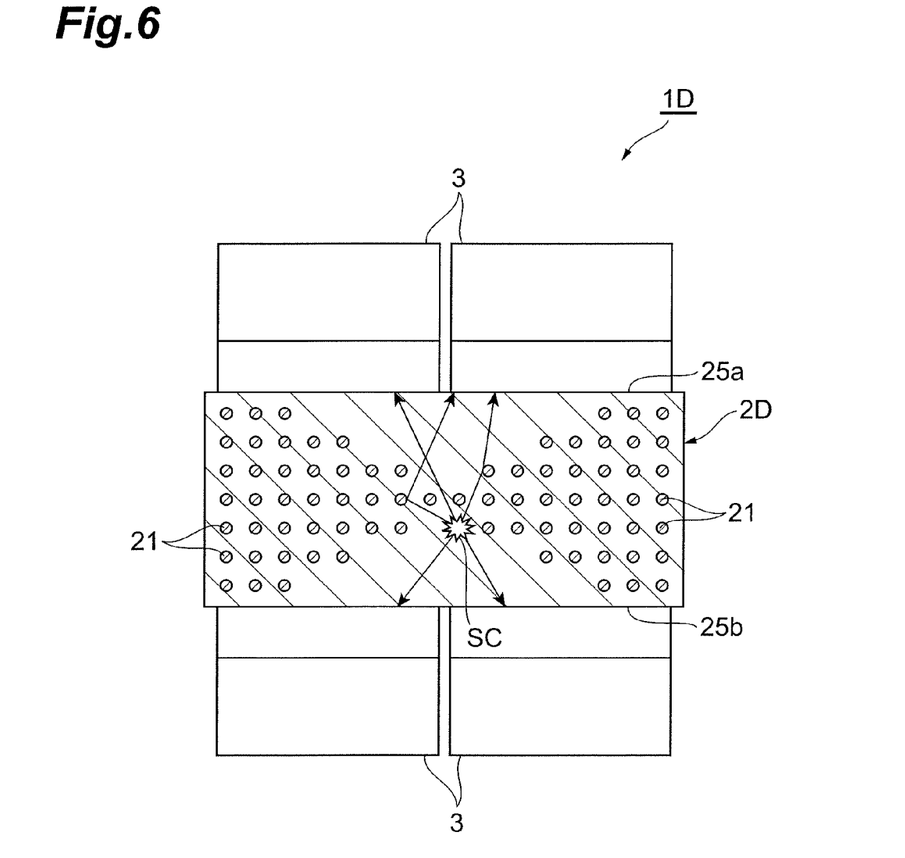
FIG. 6 is a side cross sectional view showing a constitution of a radiation detector as another modified example of FIG. 5.

Further, FIG. 6 is a side cross sectional view showing a constitution of a radiation detector 1D as another modified example. The radiation detector 1D is provided with a scintillator 2D similar in shape (appearance) to the scintillator 2B of the previously described Modified Example 1 and a plurality of photodetectors 3 arranged respectively on a pair of faces 25a, 25b to which the scintillator 2D opposes. In the radiation detector 1D as well, the modified regions 21 are distributed at an equal density except at a certain region of the scintillator 2D. At a region close to the center of the scintillator 2D when viewed from the faces 25a, 25b where the photodetectors 3 are arranged (in particular, a region close to the center of the face 25a and a region close the center of the face 25b), the modified regions 21 are reduced in density. The modified regions 21 may be arranged as described above and are able to favorably make scintillation light SC generated near the center of the scintillator 2D incident into each of the photodetectors 3.

MODIFIED EXAMPLE 3

Figure 7:
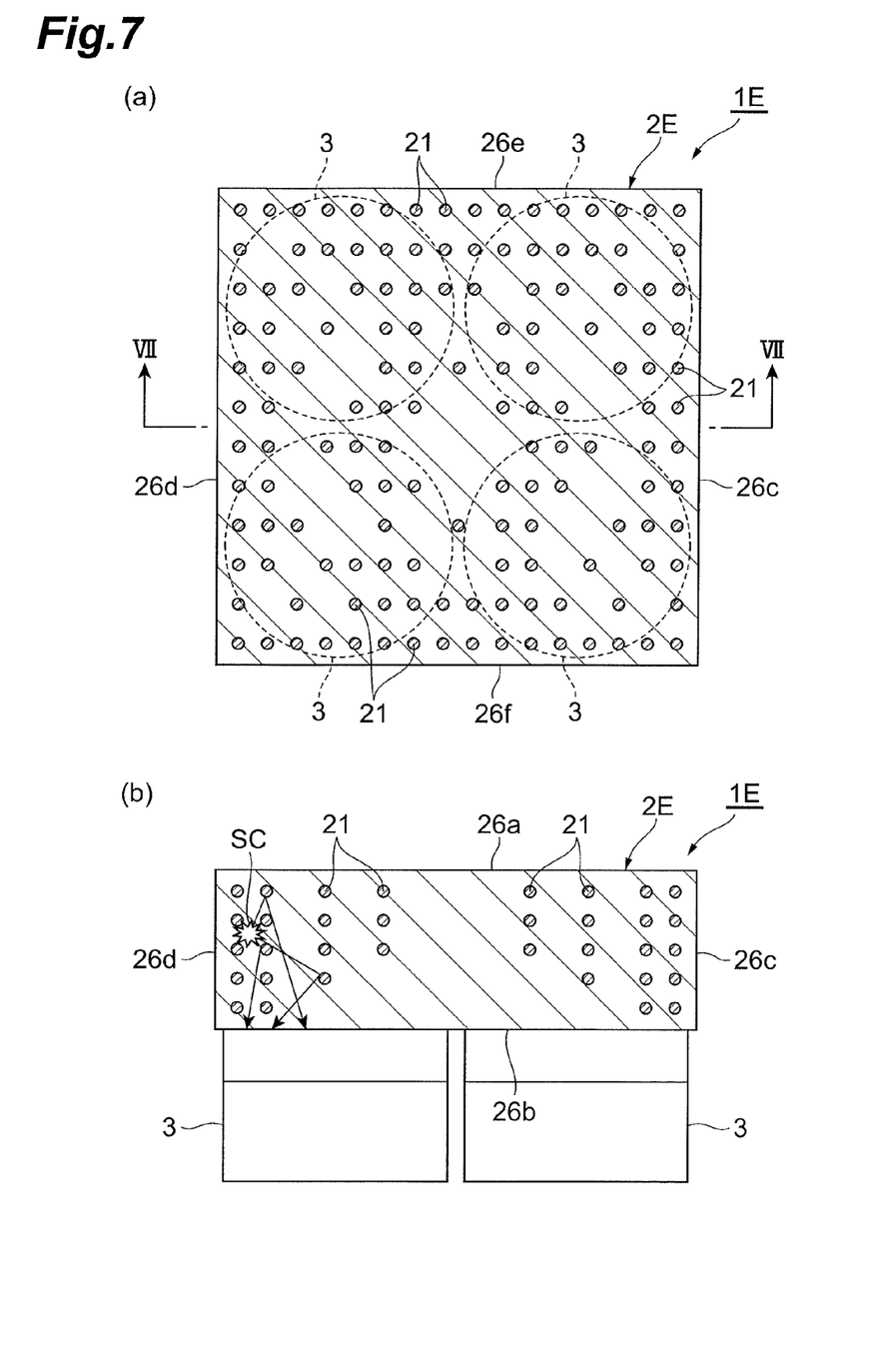
FIG. 7 shows views showing a constitution of the radiation detector related to the modified example.

FIG. 7 are views which show a constitution of a radiation detector 1E as still another modified example of the radiation detector in the above-described embodiment. FIG. 7(a) shows a planar cross sectional view of a scintillator 2E installed on the radiation detector 1E. FIG. 7(b) shows a cross section taken along line VII to VII in FIG. 7(a), that is, a side cross section of the radiation detector 1E. The radiation detector 1E of the present modified example is provided with the scintillator 2E and a plurality of photodetectors 3. It is noted that the plurality of photodetectors 3 are similar in constitution and arrangement to the previously described embodiment (FIG. 1).

The scintillator 2E is similar in shape (appearance) to the previously described scintillator 2A and provided with a pair of plate faces 26a, 26b and four side faces 26c, 26d, 26e, 26f orthogonal to the faces 26a, 26b. Further, a constitution material of the scintillator 2E is similar to that of the scintillator 2A.

The scintillator 2E of the present modified example is different from the scintillator 2A of the above-described embodiment in arrangement of a plurality of modified regions 21. That is, in the scintillator 2E of the present modified example, the modified regions 21 are different in density between a region close to the center of the scintillator 2E when viewed from the face 26b where the photodetectors 3 are arranged and a peripheral region. The modified regions 21 are further increased in density as coming closer to the four side faces 26c, 26d, 26e, 26f from the center of the scintillator 2E. The modified regions 21 are arranged as described above, by which scintillation light SC generated at the peripheral region can be suppressed from spreading to the center of the scintillator 2A to reduce the distortion at the peripheral region as found in calculation results at a radiation incident position (light emitting position.)

Figure 8:
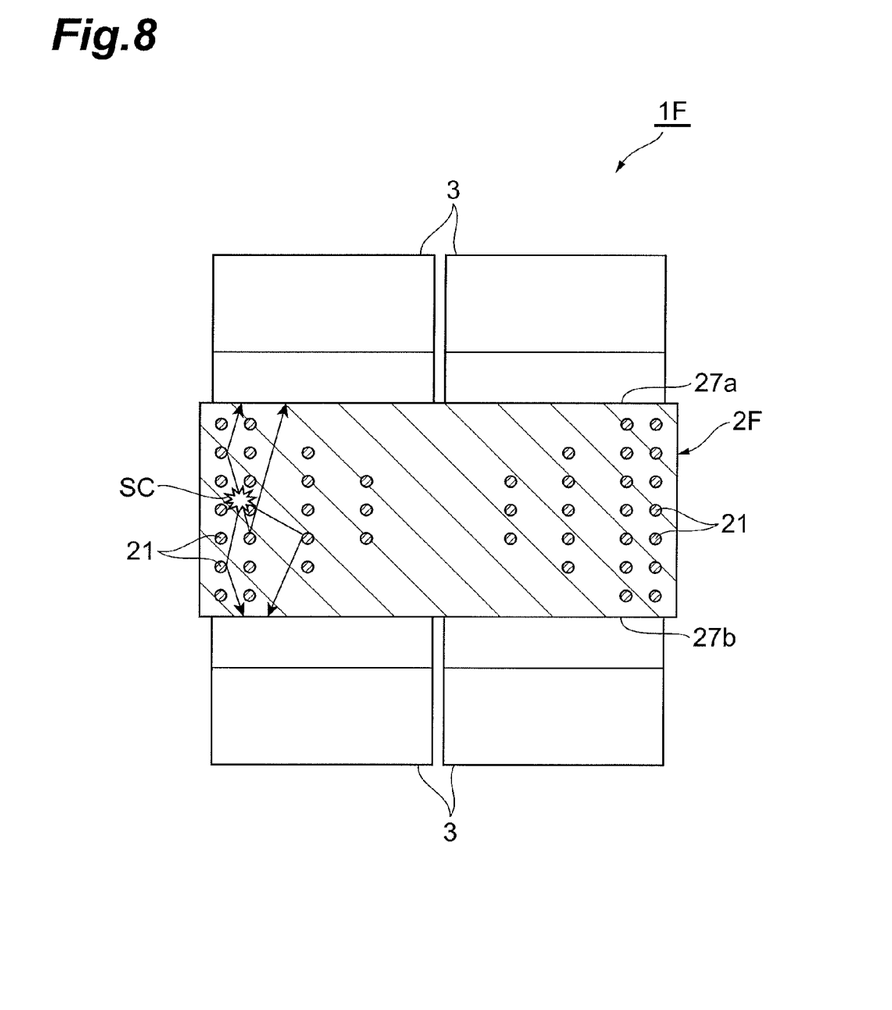
FIG. 8 is a side cross sectional view showing a constitution of a radiation detector as still another modified example of FIG. 7.

Further, FIG. 8 is a side cross sectional view showing a constitution of a radiation detector 1F as another modified example. The radiation detector 1F is provided with a scintillator 2F having a shape (appearance) similar to the scintillator 2B of the previously described Modified Example 1 and a plurality of photodetectors 3 arranged respectively on a pair of faces 27a, 27b to which the scintillator 2F opposes. In the radiation detector 1F as well, the modified regions 21 are different in density between a region close to the center of the scintillator 2F when viewed from the faces 27a, 27b where the photodetectors 3 are arranged and a peripheral region. The modified regions 21 are further increased in density as coming closer to the side faces from the center of the scintillator 2F. The modified regions 21 may be arranged as described above, and scintillation light SC generated near the center of the scintillator 2F can be favorably made incident into each of the photodetectors 3.

The scintillator manufacturing method and the radiation detector of the present invention shall not be limited to the above-described embodiments but are applicable to various modifications. For example, the above-described embodiments and the individual modified examples show scintillators in cubic and rectangular solid shapes. However, the scintillator of the present invention shall not be limited to the above-described shapes but is applicable to other shapes, for example, a polyhedron and a sphere having a curved face. In particular, a spherical scintillator is able to obtain an isotropic sensitivity to incident radiation. Further, in place of femtosecond pulse laser light Lf, a continuous-wave laser beam may be used or a picosecond pulse laser beam, etc., may be used.

The invention claimed is:

1. A method for manufacturing a scintillator used in a radiation detector comprising the scintillator and a plurality of photodetectors or a position-sensitive photodetector optically coupled to a surface of the scintillator,
the method for manufacturing the scintillator comprising a step of:
forming a plurality of modified regions by irradiating an inside of a crystalline lump which will act as the scintillator with a laser beam, wherein the plurality of modified regions are three-dimensionally dotted and have a refractive index different from a refractive index of a surrounding region within the inside of the crystalline lump,
wherein each of the modified regions is arranged in such a manner that scintillation light of the scintillator is allocated at an allocation ratio according to an optimum response function for a position of the plurality of photodetectors or the position-sensitive photodetector to each of the plurality of photodetectors or to the position-sensitive photodetector.

2. The method for manufacturing the scintillator according to claim 1, wherein each of the plurality of modified regions is at least one of a region scattering light and a region constituting a diffraction lens.

3. A radiation detector comprising:
a scintillator containing a plurality of modified regions; and
a plurality of photodetectors or a position-sensitive photodetector optically coupled to a surface of the scintillator; wherein
the plurality of modified regions are formed by irradiating an inside of a crystalline lump which will act as the scintillator with a laser beam, and
the plurality of modified regions are three-dimensionally dotted and have a refractive index different from a refractive index of a surrounding region within the inside of the crystalline lump,
wherein each of the modified regions is arranged in such a manner that scintillation light of the scintillator is allocated at an allocation ratio according to an optimum response function for a position of the plurality of photodetectors or the position-sensitive photodetector to each of the plurality of photodetectors or to the position-sensitive photodetector.

4. The radiation detector according to claim 3, wherein each of the plurality of modified regions is at least one of a region scattering light and a region constituting a diffraction lens.

5. A scintillator comprising:
a plurality of modified regions formed by irradiating an inside of a crystalline lump which will act as the scintillator with a laser beam, wherein the plurality of modified regions are three-dimensionally dotted and have a refractive index different from a refractive index of a surrounding region within the inside of the crystalline lump, wherein each of the modified regions is arranged in such a manner that scintillation light of the scintillator is allocated at an allocation ratio according to an optimum response function for a position of a plurality of photodetectors or a position-sensitive photodetector to each of the plurality of photodetectors or to the position-sensitive photodetector.

* * * * *